United States Patent
Zhang et al.

(10) Patent No.: US 11,955,056 B2
(45) Date of Patent: Apr. 9, 2024

(54) SPLITTER, LED DISPLAY SYSTEM, METHOD FOR CONFIGURING DISPLAY SCREEN

(71) Applicant: XI'AN NOVASTAR TECH CO., LTD., Shaanxi (CN)

(72) Inventors: Botong Zhang, Shaanxi (CN); Guifeng Wei, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 130 days.

(21) Appl. No.: 17/052,531

(22) PCT Filed: Jul. 30, 2019

(86) PCT No.: PCT/CN2019/098346
§ 371 (c)(1),
(2) Date: Feb. 3, 2023

(87) PCT Pub. No.: WO2021/016850
PCT Pub. Date: Feb. 4, 2021

(65) Prior Publication Data
US 2023/0162662 A1    May 25, 2023

(51) Int. Cl.
G09G 3/32    (2016.01)
G06F 3/14    (2006.01)

(52) U.S. Cl.
CPC .............. *G09G 3/32* (2013.01); *G06F 3/1446* (2013.01); *G09G 2300/026* (2013.01); *G09G 2370/04* (2013.01); *G09G 2370/10* (2013.01)

(58) Field of Classification Search
CPC ....................................................... G09G 3/32
See application file for complete search history.

(56) References Cited

U.S. PATENT DOCUMENTS

| 2010/0177017 A1 | 7/2010 | Zeng et al. |
| 2017/0178586 A1 | 6/2017 | Kim et al. |

FOREIGN PATENT DOCUMENTS

| CN | 103680402 A | 3/2014 |
| CN | 104992672 A | 10/2015 |
| CN | 105516629 A | 4/2016 |
| CN | 106067295 A | 11/2016 |
| CN | 206100251 U | 4/2017 |
| CN | 110018804 A | 7/2019 |

OTHER PUBLICATIONS

Search Report for corresponding EP application No. 19937371.3 dated Feb. 9, 2022.

*Primary Examiner* — Gustavo Polo
(74) *Attorney, Agent, or Firm* — Samson G. Yu

(57) ABSTRACT

The embodiments of the disclosure disclose a splitter, an LED display system, a method for configuring display screen and a device for configuring display screen. The splitter is applicable to an LED display screen, wherein the LED display screen includes a plurality of display units, each of the display units includes an assembly controller and an LED display assembly electrically connected to the assembly controller, and the LED display assembly includes a plurality of LED display pixels; and the splitter includes: a processor; a master interface electrically connected to the processor; and a plurality of loading interfaces electrically connected to the processor, wherein each of the loading interfaces is configured to load one of the display units or a plurality of cascaded display units.

15 Claims, 7 Drawing Sheets

SPLITTER, LED DISPLAY SYSTEM, METHOD FOR CONFIGURING DISPLAY SCREEN

TECHNICAL FIELD

The disclosure relates to the field of display technology, and in particular to a splitter, an LED display system, a method for configuring display screen for configuring display screen.

BACKGROUND

At present, in an application scenario where the number of screen bodies is large but a single screen body has few pixel points, such as a bamboo screen and a creative screen, transversal wiring is not allowed between the screen bodies, and therefore, the screen bodies are independent of each other. Each independent screen body comprises one display unit or a plurality of cascaded display units, and each independent screen body needs to be connected to an output interface, such as an output network port, of a system controller for loading. When the bamboo screen or the creative screen has tens or even more than one hundred independent screen bodies, correspondingly, more output network ports are required. At present, the number of output network ports is increased by increasing the number of system controllers; however, when a plurality of system controllers are used to implement the bamboo screen or the creative screen, costs are greatly increased.

Therefore, in order to implement an application scenario where a small number of, for example, one system controller, is used to load a large number of independent screen bodies, on the one hand, the problem that the number of output network ports is small needs to be solved, and on the other hand, the problem of configuration of a plurality of independent screen bodies needs to be solved.

SUMMARY

In one aspect, a splitter provided in the embodiments of the disclosure is applicable to an LED display screen, wherein the LED display screen includes a plurality of display units, each of the display units includes an assembly controller and an LED display assembly electrically connected to the assembly controller, and the LED display assembly includes a plurality of LED display pixels; and the splitter includes: a processor; a master interface electrically connected to the processor; and a plurality of loading interfaces, electrically connected to the processor respectively, wherein each of the loading interfaces is configured to load one of the display units or a plurality of the cascaded display units, wherein, the processor is configured to forward image data input from the master interface to the plurality of loading interfaces, so that the assembly controller of each of the display units loaded on the plurality of loading interfaces performs, according to its own sequence number, a capture operation on image data output by the corresponding loading interfaces to acquire its own image data so as to drive and control the LED display assembly of the display unit to display; and the sequence numbers of the assembly controllers of the first display units respectively first loaded on the plurality of loading interfaces are different from each other.

In an embodiment of the disclosure, the processor includes a programmable logic device and a microcontroller electrically connected to the programmable logic device, and the master interface and the plurality of loading interfaces are network ports electrically connected to the programmable logic device, respectively.

In an embodiment of the disclosure, the splitter further includes a slave interface electrically connected to the processor, and the processor is further configured to forward image data input from the master interface to the slave interface for transmission to a next-level splitter.

In an embodiment of the disclosure, the processor is further configured to generate a sequence packet of each of the loading interfaces according to configuration parameters input from the master interface, and enable the sequence packet to be output through the loading interface, so that assembly controllers of all display units loaded on the loading interfaces determine their own sequence numbers on the basis of the sequence packet, wherein the configuration parameters include a serial number of each of the loading interfaces and the sequence number of the assembly controller of the first display unit loaded on the loading interface, and the sequence numbers of the assembly controllers of the first display units included in the sequence packets respectively corresponding to the plurality of loading interfaces are different from each other.

In another aspect, an LED display system provided in the embodiments of the disclosure includes: a plurality of first display units, wherein each of the first display units includes a first assembly controller and an LED display assembly electrically connected to the first assembly controller; a first splitter, provided with a first processor and a first master interface, a slave interface and a plurality of first loading interfaces electrically connected to the first processor, wherein each of the first loading interfaces is configured to load one of the first display units or a plurality of cascaded first display units, and the first processor is configured to forward image data input from the first master interface to the plurality of first loading interfaces and the slave interface, so that the first assembly controller of each of the first display units performs, according to its own sequence number, a capture operation on image data output by the corresponding first loading interface to acquire its own image data so as to drive and control the LED display assembly of the first display unit to display; a plurality of second display units, wherein each of the second display units includes a second assembly controller and an LED display assembly electrically connected to the second assembly controller; and a second splitter, provided with a second processor and a second master interface and a plurality of second loading interfaces electrically connected to the second processor, wherein the second master interface is electrically connected to the slave interface of the first splitter, each of the second loading interfaces is configured to load one of the second display units or a plurality of cascaded second display units, and the second processor is configured to forward image data input from the second master interface to the plurality of second loading interfaces, so that the second assembly controller of each of the second display units performs, according to its own sequence number, a capture operation on image data output by the corresponding second loading interface to acquire its own image data so as to drive and control the LED display assembly of the second display unit to display, wherein, the sequence numbers of the first assembly controllers of the first display units respectively first loaded by the plurality of first loading interfaces are different from each other, the sequence numbers of the second assembly controllers of the second display units respectively first loaded by the plurality of second loading interfaces are different from each other, and the sequence numbers of the first assembly controllers of the first display units respectively first loaded on the plurality of first loading interfaces are different from the sequence numbers of the second assembly controllers of the second display units respectively first loaded on the plurality of second loading interfaces.

In this embodiment, an LED display system based on a plurality of splitters is provided, wherein one display unit or a plurality of cascaded display units respectively connected to each of the first loading interfaces and each of the second loading interfaces form one display unit group, and the one display unit group is one of the independent screen bodies.

In an embodiment of the disclosure, the first processor includes a programmable logic device and a microcontroller electrically connected to the programmable logic device, and the first master interface, the slave interface and the plurality of first loading interfaces are network ports electrically connected to the programmable logic device, respectively.

In an embodiment of the disclosure, the LED display system further includes a system controller connected to the first master interface of the first splitter by means of a cable.

In an embodiment of the disclosure, the system controller includes a video interface, a video decoder, a programmable logic device, a microcontroller and output network ports, wherein the video decoder is electrically connected between the video interface and the programmable logic device, and the microcontroller and the output network ports are electrically connected to the programmable logic device, respectively; and the output network ports are connected to the first master interface of the first splitter by means of the cable.

In an embodiment of the disclosure, the first processor is further configured to generate a sequence packet of each of the first loading interfaces according to configuration parameters input from the first master interface, and enable the sequence packet to be output through the first loading interface, so that first assembly controllers of all first display units loaded on the first loading interface determine their own sequence numbers on the basis of the sequence packet, wherein the configuration parameters include a serial number of each of the first loading interfaces and the sequence number of the first assembly controller of the first display unit loaded on the first loading interface, and the sequence numbers of the first assembly controllers of the first display units included in the sequence packets respectively corresponding to the plurality of first loading interfaces are different from each other.

In still another aspect, the embodiments of the disclosure provide a method for configuring display screen, which is applicable to a splitter electrically connected to an LED display screen; and includes: acquiring an initial sequence packet, wherein the initial sequence packet includes a splitter serial number data segment and a first assembly controller serial number data segment; acquiring configuration parameters, wherein the configuration parameters include a serial number of the splitter, serial numbers of a plurality of loading interfaces of the splitter and a serial number of an assembly controller in the first display unit loaded on each of the loading interfaces; and updating the content of the first assembly controller serial number data segment in the initial sequence packet according to the serial number of the assembly controller in the first display unit loaded on each of the loading interfaces, so as to obtain a plurality of target sequence packets respectively corresponding to the plurality of loading interfaces and output respective target sequence packets through each of the loading interfaces, so that assembly controllers in all display units loaded on the loading interface determine their own sequence numbers in sequence, the plurality of target sequence packets being different from each other.

In an embodiment of the disclosure, the method for configuring display screen further includes: updating the content of the splitter serial number data segment in the initial sequence packet, and keeping the content of the first assembly controller serial number data segment unchanged, so as to obtain a new initial sequence packet and deliver, through a slave interface of the splitter, same to a next-level splitter electrically connected to the slave interface.

In an embodiment of the disclosure, each of the loading interfaces and the slave interface are network ports, respectively.

In yet another aspect, the embodiments of the disclosure provide a device for configuring display screen, which is applicable to a splitter electrically connected to an LED display screen; and includes: a first acquisition module, configured to acquire an initial sequence packet, wherein the initial sequence packet includes a splitter serial number data segment and a first assembly controller serial number data segment; a second acquisition module, configured to acquire configuration parameters, wherein the configuration parameters include a serial number of the splitter, serial numbers of a plurality of loading interfaces of the splitter and a serial number of an assembly controller in the first display unit loaded on each of the loading interfaces; and a sequence module, configured to update the content of the first assembly controller serial number data segment in the initial sequence packet according to the serial number of the assembly controller in the first display unit loaded on each of the loading interfaces, so as to obtain a plurality of target sequence packets respectively corresponding to the plurality of loading interfaces and output respective target sequence packets through each of the loading interfaces, so that assembly controllers in all display units loaded on the loading interface determine their own sequence numbers in sequence, the plurality of target sequence packets being different from each other.

In an embodiment of the disclosure, the device for configuring display screen further includes: an update module, configured to update the content of the splitter serial number data segment in the initial sequence packet and keep the content of the first assembly controller serial number data segment unchanged, so as to obtain a new initial sequence packet and deliver, through a slave interface of the splitter, same to a next-level splitter electrically connected to the slave interface.

In an embodiment of the disclosure, each of the loading interfaces and the slave interface are network ports, respectively.

BRIEF DESCRIPTION OF THE DRAWINGS

In order to more clearly explain the technical solutions in the embodiments of the disclosure, the accompanying drawings used for describing the embodiments will be described briefly below. Obviously, the accompanying drawings in the following description only describe some embodiments of the disclosure. A person of ordinary skill in the art can also obtain other accompanying drawings according to these accompanying drawings without involving any inventive labor.

DETAILED DESCRIPTION OF THE EMBODIMENTS

Hereinafter, the technical solutions in the embodiments of the disclosure will be described clearly and thoroughly with reference to the accompanying drawings of the embodiments of the disclosure. Obviously, the embodiments as described are only some of the embodiments of the disclosure, and are not all of the embodiments of the disclosure. On the basis of the embodiments of the disclosure, all other embodiments obtained by a person of ordinary skill in the art without involving any inventive labor fall within the scope of protection of the disclosure.

First Embodiment

Figure 1:
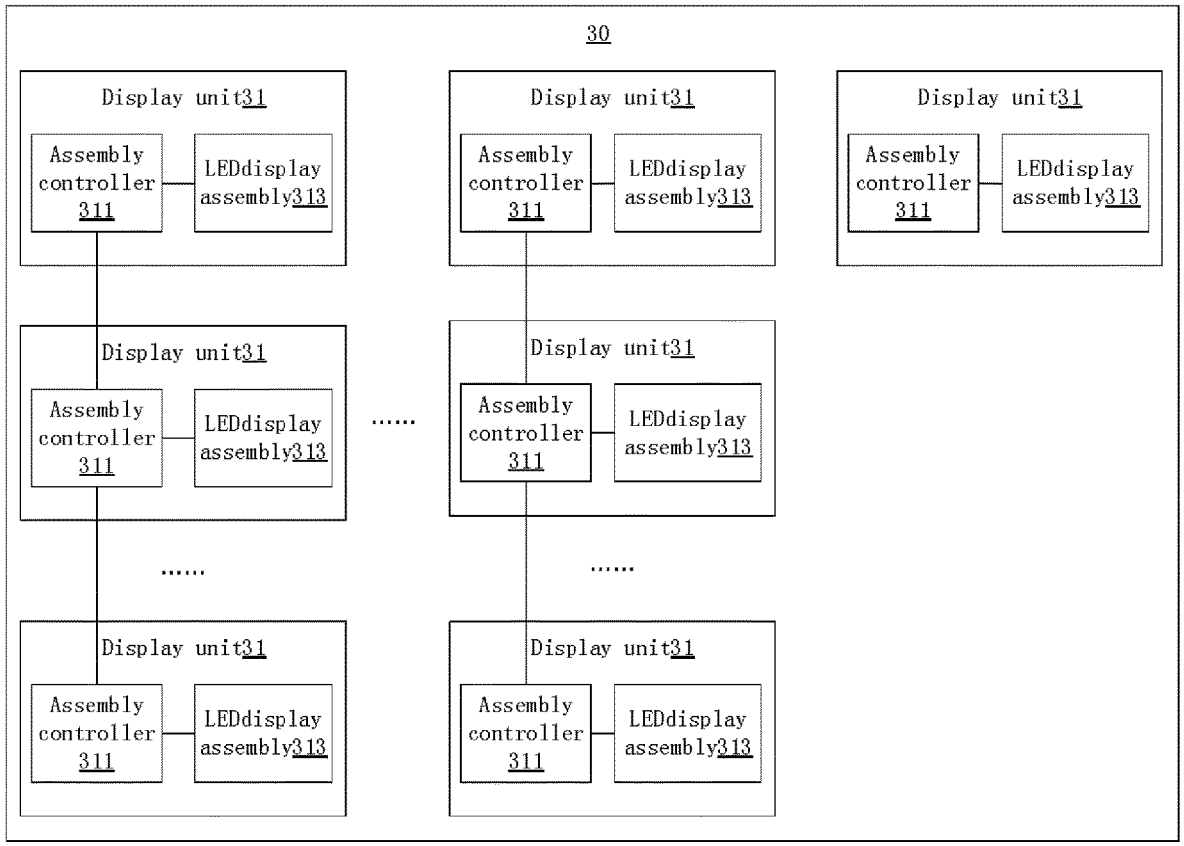
FIG. 1 is an architecture schematic diagram of an LED display screen applicable to a splitter provided in the first embodiment of the disclosure.

Referring to FIG. 1, this figure is an architecture schematic diagram of an LED display screen applicable to a splitter provided in the first embodiment of the disclosure. The LED display screen 30 comprises, for example, a plurality of display units 31. Each display unit 31 comprises, for example, an assembly controller 311 and an LED display assembly 313 electrically connected to the assembly controller 311. The assembly controller 311 is configured to, for example, drive and control the LED display assembly 311 to display an image. The assembly controller 311 is, for example, a receiving card or a scanning card. The LED display assembly 313 is, for example, an LED lamp box. One display unit 31 comprises, for example, one assembly controller 311 and one LED display assembly 313 electrically connected to the assembly controller 311. One or more display units 31 in the LED display screen 30 form multiple columns of mutually independent screen bodies, each independent screen body comprises, for example, one display unit 31 or a plurality of cascaded display units 31, and each of the independent screen bodies needs to be connected to an output interface, for example, an output network port. Therefore, how many mutually independent screen bodies the LED display 30 has, at least the same number of output network ports are required to load the LED display screen 30. The LED display screen 30 is, for example, a bamboo screen or a creative screen; however, the embodiments of the disclosure are not limited thereto.

Figure 2:
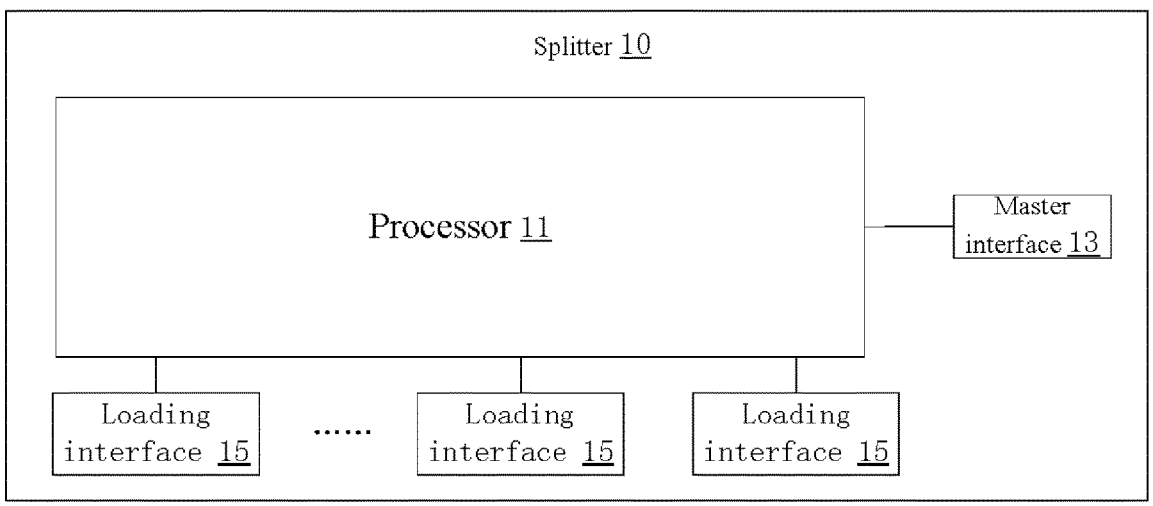
FIG. 2 is an architecture schematic diagram of the splitter provided in the first embodiment of the disclosure.

Referring to FIG. 2, this figure is an architecture schematic diagram of the splitter provided in the first embodiment of the disclosure. The splitter 10 comprises, for example, a processor 11, a master interface 13 electrically connected to the processor 11, and a plurality of loading interfaces 15 electrically connected to the processor 11.

Specifically, the processor 11 is configured to, for example, forward image data input from the master interface 13 to the plurality of loading interfaces 15, and the plurality of loading interfaces 15, for example, output the image data to the assembly controllers 311 of all the display units 31 connected to the loading interfaces 15, respectively. The assembly controller 311 of each display unit 31 performs, according to its own sequence number, a capture operation on image data output by the loading interface 15 corresponding to itself so as to obtain its own image data, and the assembly controller 311 of each display unit 31 drives and controls, on the basis of its own image data, an LED display assembly 313 connected thereto to display an image. The sequence numbers of the assembly controllers of the first display units 31 (e.g., corresponding to the first row of display units 31 in FIG. 1) respectively first loaded on the plurality of loading interfaces 15 of the splitter 10 are different from each other.

In one particular embodiment, the splitter 10 comprises, for example, a processor 11 and three loading interfaces 15 electrically connected to the processor 11. The sequence numbers of the assembly controllers 311 of all the display units 31 loaded on the first loading interface 15 of the splitter 10 are 1, 2 and 3 in sequence; the sequence numbers of the assembly controllers 311 of the display units 31 loaded on the second loading interface 15 of the splitter 10 are 4 and 5 in sequence; and the sequence number of the assembly controller 311 of the display unit 31 loaded on the third loading interface 15 of the splitter 10 is 6. The assembly controller 311 of the first display unit 31 loaded on the first loading interface 15 of the splitter 10 captures, for example, according to its sequence number 1, the image data output by the first loading interface 15. For a method for capturing the image data by the assembly controllers 311 of other display units 31, reference may be made to the process, and details are not described herein again.

Figure 3:
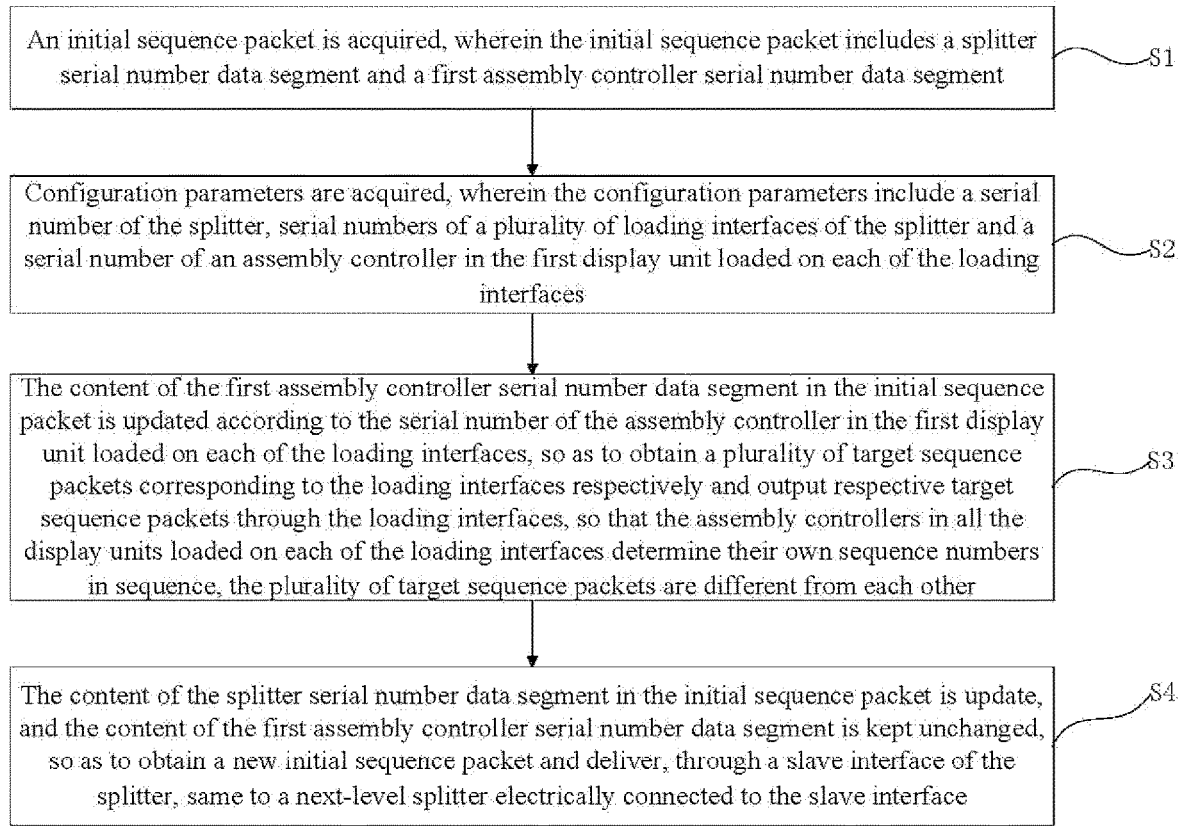
FIG. 3 is a schematic flowchart of a method for configuring display screen executed by the processor in FIG. 2.

Referring to FIG. 3, in one embodiment, the processor 11 is further configured to perform a method for configuring display screen so as to determine a sequence number of an assembly controller 311 of each display unit 31 loaded on the plurality of loading interfaces 15 of the splitter 10. The process in which the processor 11 performs the method for configuring display screen comprises, for example:

step S1, an initial sequence packet is acquired, wherein the initial sequence packet includes, for example, a splitter serial number data segment and a first assembly controller serial number data segment. The content of the splitter serial number data segment represents a serial number of the splitter, for example, aa, and the content of the first assembly controller serial number data segment represents a serial number of the first assembly controller, for example, bb.

In one particular embodiment, the processor 11 acquires, for example, through the master interface 13, the initial sequence packet. The initial sequence packet is, for example, 0x0100, wherein 01 is, for example, the splitter serial number data segment, and 00 is, for example, the first assembly controller serial number data segment.

Step S2, configuration parameters are acquired, wherein the configuration parameters include a serial number of the splitter 10, serial numbers of a plurality of loading interfaces 15 of the splitter 10 and a serial number of an assembly controller 311 in the first display unit 31 loaded on each loading interface 15.

In one embodiment, the processor 11 acquires, for example, through the master interface 13, the configuration parameters. For example, there are a plurality of configuration parameters. The splitter serial number represents the serial number of the splitter 10, for example, aa; the loading interface serial number represents the serial number of a loading interface 15 in the splitter 10, for example, bb; and the serial number of the assembly controller 311 in the first display unit 31 loaded on the loading interface 15 is, for example, cc. The configuration parameter is, for example, 010307, which indicates, for example, that the serial number of the assembly controller 311 of the first display unit 31 loaded on the loading interface 15 with the loading interface serial number 03 of the splitter 10 with the splitter serial number 01 is 07.

In one embodiment, the processor 11 acquires, through the master interface 13, three different configuration parameters, for example, 010101, 010204 and 010308. For example, the first configuration parameter indicates that the serial number of the assembly controller 311 of the first display unit 31 under the loading interface 15 with the loading interface serial number 01 of the splitter 10 with the splitter serial number 01 is 01; the second configuration parameter indicates that the serial number of the assembly controller 311 of the first display unit 31 under the loading interface 15 with the loading interface serial number 02 of the splitter 10 with the splitter serial number 01 is 04; and the third configuration parameter indicates that the serial number of the assembly controller 311 of the first display unit 31 under the loading interface 15 with the loading interface serial number 03 of the splitter 10 with the splitter serial number 01 is 08.

The process in which the processor 11 determines the serial number of the assembly controller 31 of each display unit 30 according to set configuration parameters is provided.

Step S3, the content of the first assembly controller serial number data segment in the initial sequence packet acquired in step S1 is updated according to the serial number of the assembly controller 311 in the first display unit 31 loaded on each of the loading interfaces 15 determined in step 2, so as to obtain a plurality of target sequence packets corresponding to the loading interfaces 15 respectively and output respective target sequence packets through the loading interfaces 15, so that the assembly controllers 311 in all the display units 31 loaded on each of the loading interfaces 15 determine their own sequence numbers in sequence, the plurality of target sequence packets being different from each other.

In one particular embodiment, for example, in step S2, three configuration parameters, i.e., 010101, 010204 and 010308 are acquired, and for example, in step S1, the acquired initial sequence packet is 0x0100. The first assembly controller serial number data segment 00 of the initial sequence packet is updated according to the serial number 01 of the assembly controller in the first display unit of the first configuration parameter 010101, so as to obtain that the target sequence packet of the loading interface 15 with the loading interface serial number 01 of the splitter 10 with the splitter serial number 01 is 0x0101, and the target sequence packet 0x0101 is output to the assembly controller 311 in the first display unit 31 loaded on the loading interface 15 with the loading interface number 01 of the splitter 10 with the splitter serial number 01. The assembly controller 311 in the first display unit 31 obtains its own sequence number 01, and the assembly controller 311 in the first display unit 31 adds one to the first assembly controller serial number data segment in the target sequence packet to obtain an updated target sequence packet 0x0102, and deliver the updated target sequence packet to an assembly controller 311 in the second display unit 31 cascaded with the assembly controller 311 in the first display unit 31. The assembly controller 311 in the second display unit 31 obtains its own sequence number 02, and the assembly controller 311 in the second display unit 31 adds one to the first assembly controller serial number data segment in the target sequence packet to obtain an updated target sequence packet 0x0103 and continues to deliver same, until the assembly controllers 311 of all the display units 31 under the loading interface 15 with the loading interface serial number 01 of the splitter 10 with the splitter serial number 01 are all determined and obtain their own sequence numbers. The first assembly controller serial number data segment 00 of the initial sequence packet is updated according to the serial number 04 of the assembly controller in the first display unit of the second parameter packet 010204, so as to obtain that the target sequence packet of the loading interface 15 with the loading interface serial number 02 of the splitter 10 with the splitter serial number 01 is 0x0104, and the target sequence packet 0x0104 is output. The first assembly controller serial number data segment 00 of the initial sequence packet is updated according to the serial number 08 of the assembly controller in the first display unit of the third parameter packet 010308, so as to obtain that the target sequence packet of the loading interface 15 with the loading interface serial number 03 of the splitter 10 with the splitter serial number 01 is 0x0108, and the target sequence number 0x0108 is output.

Referring to FIG. 3 again, in one embodiment, the processor 11 performs the method for configuring display screen, for example:

step S4, the content of the splitter serial number data segment in the initial sequence packet is updated, and the content of the first assembly controller serial number data segment is kept unchanged, so as to obtain a new initial sequence packet and deliver, through a slave interface of the splitter, same to a next-level splitter electrically connected to the slave interface.

In one particular embodiment, for example, when the slave interface 14 of the splitter 10 is connected to the master interface of another splitter, the processor 11 updates the content of the splitter serial number data segment in the initial sequence packet, for example, 0x0100, which is acquired in step S1, and the processor 11, for example, adds one to the splitter serial number data segment to obtain a new initial sequence packet 0x0200; furthermore, the processor delivers the new initial sequence packet 0x0200 to another splitter through the slave interface 14, and the processor of another splitter receives, for example, through the master interface of another splitter, the new initial sequence packet 0x0200. This process is step S1 above. The processor of another splitter performs step S2 and step S3 so as to complete that the assembly controllers 311 of all the display units 31 loaded on the plurality of loading interfaces of another splitter determine their own sequence numbers, and details are not described herein again.

Figure 4:
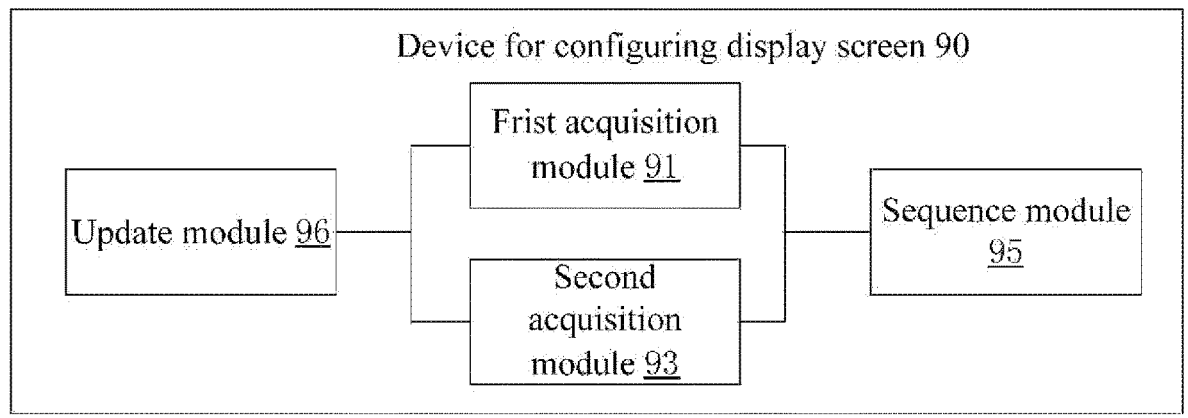
FIG. 4 is an architecture schematic diagram of a device for configuring display screen, which is configured to execute the method for configuring display screen, of the processor in FIG. 2.

Referring to FIG. 4, in one embodiment, the processor 11 in the splitter 10 has, for example, a device for configuring display screen 90 configured to execute the foregoing method for configuring display screen. The device for configuring display screen 90 comprises, for example, a first acquisition module 91, a second acquisition module 93, and a sequence module 95 connected to the first acquisition module 91 and the second acquisition module 93.

Specifically, the first acquisition module 91 is configured to, for example, acquire an initial sequence packet, wherein the initial sequence packet comprises a splitter serial number data segment and a first assembly controller serial number data segment. The second acquisition module 93 is configured to, for example, acquire configuration parameters, wherein the configuration parameters include a serial number of the splitter, serial numbers of a plurality of loading interfaces of the splitter, and a serial number of an assembly controller in the first display unit loaded on each of the loading interfaces. For a specific operation process of the first acquisition module 91 and the second acquisition module 93, reference can be made to the detailed description of the foregoing method for configuring display screen, and details are not described herein again.

In one embodiment, the first acquisition module 91 and the second acquisition module 93 are, for example, respectively connected to the master interface 13, the first acquisition module 91 acquires, for example, the initial sequence packet received by the master interface 13, and the second acquisition module 93 acquires, for example, the configuration parameters received by the master interface 13.

Specifically, the sequence module 95 is configured to, for example, update the content of the first assembly controller serial number data segment in the initial sequence packet according to the serial number of the assembly controller in the first display unit loaded on each of the loading interfaces, so as to obtain a plurality of target sequence packets corresponding to the loading interfaces respectively and output respective target sequence packets through the loading interfaces, so that the assembly controllers in all the display units loaded on the loading interfaces determine their own sequence number in sequence, the plurality of target sequence packets being different from each other. For a specific operation process of the sequence module 95, reference can be made to the detailed description of the foregoing method for configuring display screen, and details are not described herein again.

Referring to FIG. 4 again, the device for configuring display screen 90 further comprises, for example, an update module 96, and the update module 96 is, for example, connected to the first acquisition module 91.

Specifically, the update module 96 is configured to, for example, update the content of the splitter serial number data segment in the initial sequence packet acquired by the first acquisition module 91, and keep the content of the first assembly controller serial number data segment unchanged, so as to obtain a new initial sequence packet and deliver, through a slave interface of the splitter, same to a next-level splitter electrically connected to the slave interface. For a specific operation process of the update module 96, reference can be made to the detailed description of the foregoing method for configuring display screen, and details are not described herein again.

In one particular embodiment, the device for configuring display screen 90 is, for example, an execution program running on the processor 11, and running the execution program enables the first acquisition module 91, the second acquisition module 93, the sequence module 95 and the update module 96 to cooperate to implement their respective functions so as to execute the foregoing method for configuring display screen.

Figure 5:
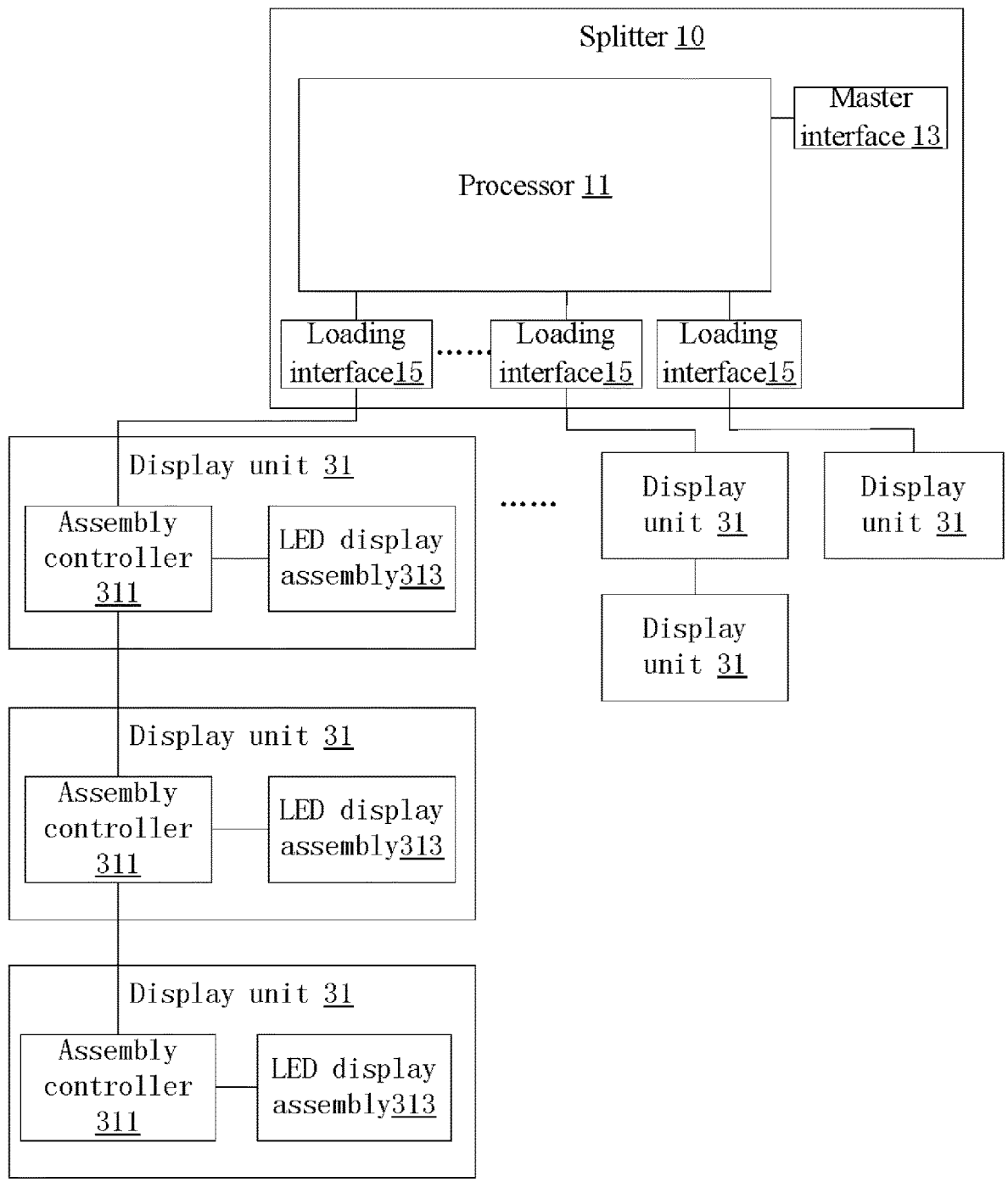
FIG. 5 is an architecture schematic diagram of an application of the splitter in FIG. 2.

Referring to FIG. 5, this embodiment provides an application of a splitter, for example, the splitter 10 as shown in FIG. 1. For example, some or all of the loading interfaces 15 of the splitter 10 are connected to one display unit 31 or a plurality of cascaded display units 31, respectively, wherein one display unit 31 or a plurality of cascaded display units 31 connected to one loading interface 15 is one independent screen body. The splitter 10 has, for example, eight loading interfaces 15, and therefore, the splitter 10 can expand eight output network ports so as to be connected to eight mutually independent screen bodies, respectively.

Figure 6:
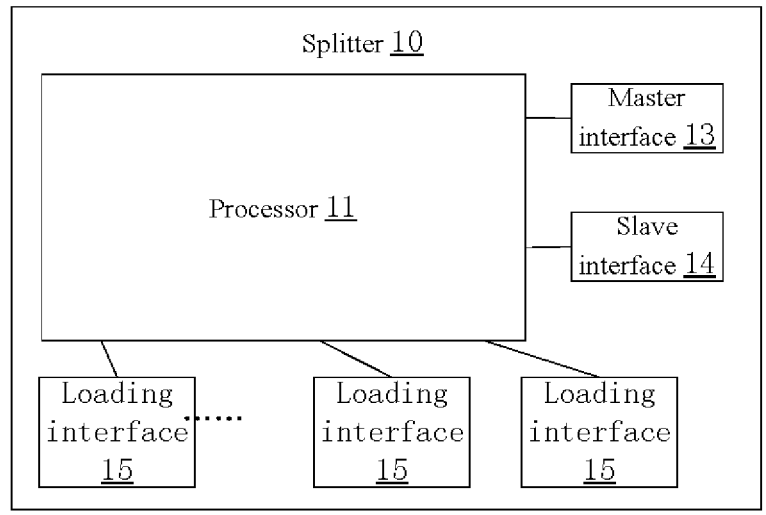
FIG. 6 is an architecture schematic diagram of another splitter provided in the first embodiment of the disclosure.

Referring to FIG. 6, in one embodiment, on the basis of the splitter 10 as shown in FIG. 1, for example, a slave interface 14 electrically connected to the processor 11 is further comprised; and the processor 11 is further configured to, for example, forward image data input from the master interface 13 to the slave interface 14 and deliver, through the slave interface 14, the image data to a next splitter 10 connected to the slave interface 14.

Another application of the splitter provided in this embodiment is, for example: two splitters 10 as shown in FIG. 6 are cascaded, wherein a slave interface 14 one splitter 10 is connected to a master interface 13 of the other splitter 10. For other implementation processes, reference can be made to FIG. 5, and details are not described herein again. In this implementation process, for example, the splitter 10 as shown in FIG. 6 and the splitter 10 as shown in FIG. 2 are also used, and details are not described herein again.

Two or more splitters 10 can be cascaded, so that the number of splitters 10 can be changed to make the number of loading interfaces 15 meet the application scenario where the LED display screen 30 has a plurality of independent screen bodies.

Figure 7:
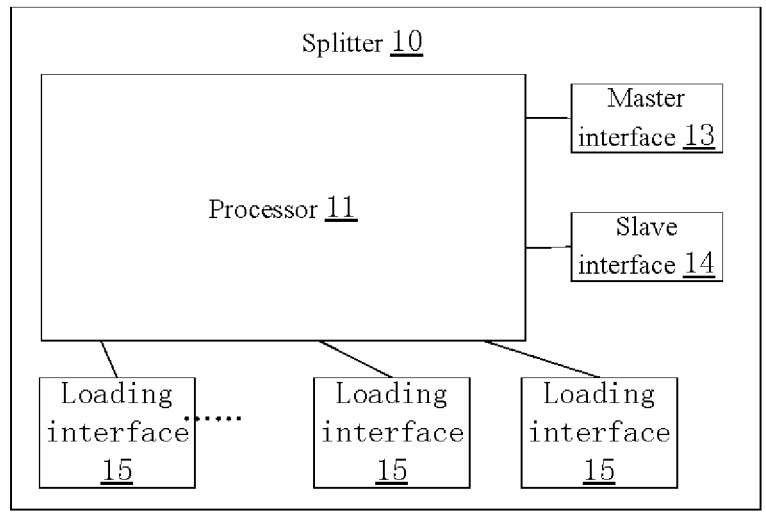
FIG. 7 is an architecture schematic diagram of still another splitter provided in the first embodiment of the disclosure.

Referring to FIG. 7, in one embodiment, one the basis of the splitter 10 as shown in FIG. 2, the processor 11 comprises, for example, a programmable logic device 111 and a microcontroller 113 electrically connected to the programmable logic device 111. Specifically, the master interface 13 is electrically connected to the programmable logic device 111, and the plurality of loading interfaces 15 are electrically connected to the programmable logic device 111, respectively.

In one particular embodiment, the master interface 13, for example, inputs image data to the programmable logic device 111, and the microcontroller 113, for example, controls the programmable logic device 111 to forward the image data to the plurality of loading interfaces 15 and output the image data to assembly controllers 311 of all display units 31 loaded on each of the loading interfaces 15. The input of the image data from the master interface 13, the forwarding of the image data to the plurality of loading interfaces 15 and the determination of the serial numbers of the assembly controllers 31 of the display units 30 loaded on the loading interface 15 are completed by means of the programmable logic device 111 and the microcontroller 113.

In one embodiment, on the basis of the splitter 10 as shown in FIG. 7, for example, a slave interface 14 electrically connected to the programmable logic device 111 is further comprised, and the microcontroller 113 controls the programmable logic device 111 to forward the image data to the salve interface 14 and output same.

Figure 8:
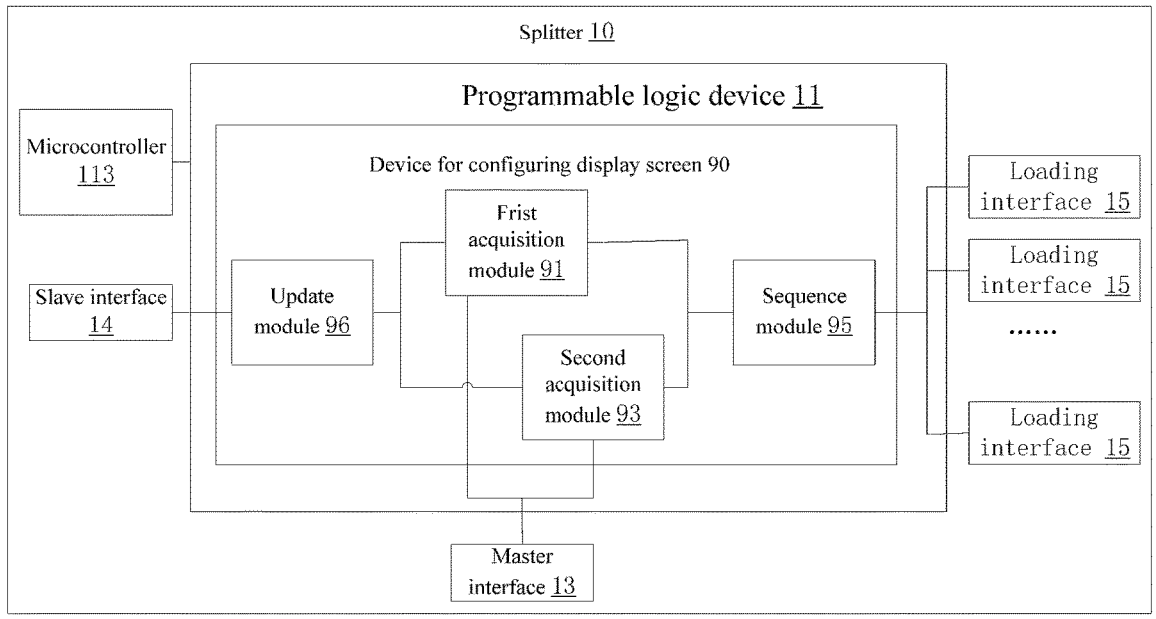
FIG. 8 is an architecture schematic diagram of yet another splitter provided in the first embodiment of the disclosure.

Referring to FIG. 8, in one embodiment, on the basis of the splitter 10 as shown in FIG. 7, the programmable logic device 11 comprises, for example, the device for configuring display screen 90 as shown in FIG. 6. Specifically, the slave interface 14 is, for example, connected to an update module 96, the plurality of loading interfaces 15 are, for example, respectively connected to a sequence module 95, and the first acquisition module 91 and the second acquisition module 93 are, for example, respectively connected to the master interface 13.

In one particular implementation process, the device for configuring display screen 90 has, for example, a plurality of sequence modules 95, each sequence module 95 is, for example, correspondingly connected to one loading interface 15, and the first acquisition module 91 and the second acquisition module 93 are, for example, respectively connected to each sequence module 95.

Figure 9:
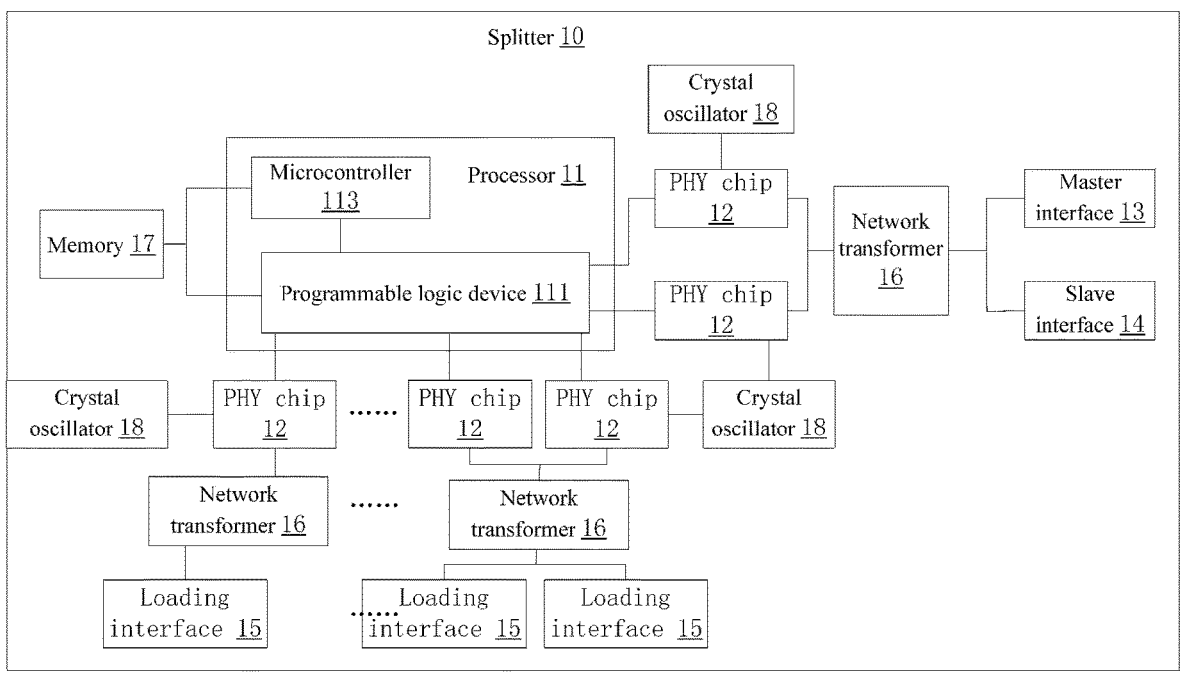
FIG. 9 is an architecture schematic diagram of still yet another splitter provided in the first embodiment of the disclosure.

Referring to FIG. 9, in one particular embodiment, the splitter 10 further comprises, for example, a memory 17 electrically connected to the processor 11, a plurality of PHY chips 12, a plurality of network transformers 16, and a plurality of crystal oscillators 18.

Specifically, the master interface 13, the slave interface 14 and the plurality of loading interfaces 15 are, for example, electrically connected to one PHY chip 12, correspondingly; the plurality of PHY chips 12 are, for example, electrically connected to the programmable logic device 111, respectively; the master interface 13, the slave interface 14 and the plurality of loading interfaces 15 are, for example, electrically connected to the network transformers 16, respectively; the network transformers 16 are, for example, electrically connected to the PHY chips 12; each PHY chip 12 is, for example, electrically connected to a crystal oscillator 18; and the memory 17 is, for example, electrically connected to the microcontroller 113 and the programmable logic device 111.

Specifically, one or more (for example, two) PHY chips 12 are, for example, electrically connected to one crystal oscillator 18. The arrangement of the plurality of crystal oscillators 18 helps to reduce the wiring complexity of a circuit board. The frequency of the crystal oscillators 18 is, for example, 25 MHz. Two PHY chips 12 are, for example, connected to one network transformer 16, and the network transformer 16 is, for example, connected to two interfaces respectively corresponding to the two PHY chips 12. The two interfaces are, for example, the master interface 13 and the slave interface 14, and the two interfaces are also, for example, two loading interfaces 15.

In one particular embodiment, the programmable logic device 111 is, for example, an FPGA (Field Programmable Gate Array) chip, and the PFGA chip is, for example, an EP4CE6F256 FPGA chip. The microcontroller 113 is, for example, an MCU (Microcontroller Unit) chip, and the MCU chip is, for example, an STM8S003F3 MCU chip. The memory 17 is, for example, a flash memory, i.e. the flash memory, and the flash memory is, for example, a VV25Q16DVSSIG flash memory chip. The PHY chips 12 are, for example, Ethernet PHY (Port Physical Layer) chips, and the Ethernet PHY chips are, for example, AR8035 Ethernet PHY chips. The network transformers 16 are, for example, Ethernet network transformer chips, and the Ethernet network transformer chips are, for example, HST-48002 Ethernet network transformer chips. The frequency of the crystal oscillators 18 is, for example, 25 MHz. The master interface 13, the slave interface 14 and the plurality of loading interfaces 15 are, for example, network ports, respectively. The network ports are, for example, RJ45 network ports. One RJ45 network port comprises, for example, a master interface 13 and a slave interface 14; and one RJ45 network port further comprises, for example, two loading interfaces 15. RG network ports can be connected by means of a network cable. The connection manner of the splitter 10 is simple.

In summary, the splitter 10 provided in the disclosure can expand a plurality of loading interfaces 15 so as to connect a plurality of independent screen bodies, respectively, and the loading interfaces 15 are the output network ports, thereby solving the problem that the number of output network ports of an existing sending card is small; and the splitter 10 can configure one display unit 31 or a plurality of cascaded display units 31 respectively connected to the plurality of loading interfaces 15.

Second Embodiment

Figure 10:
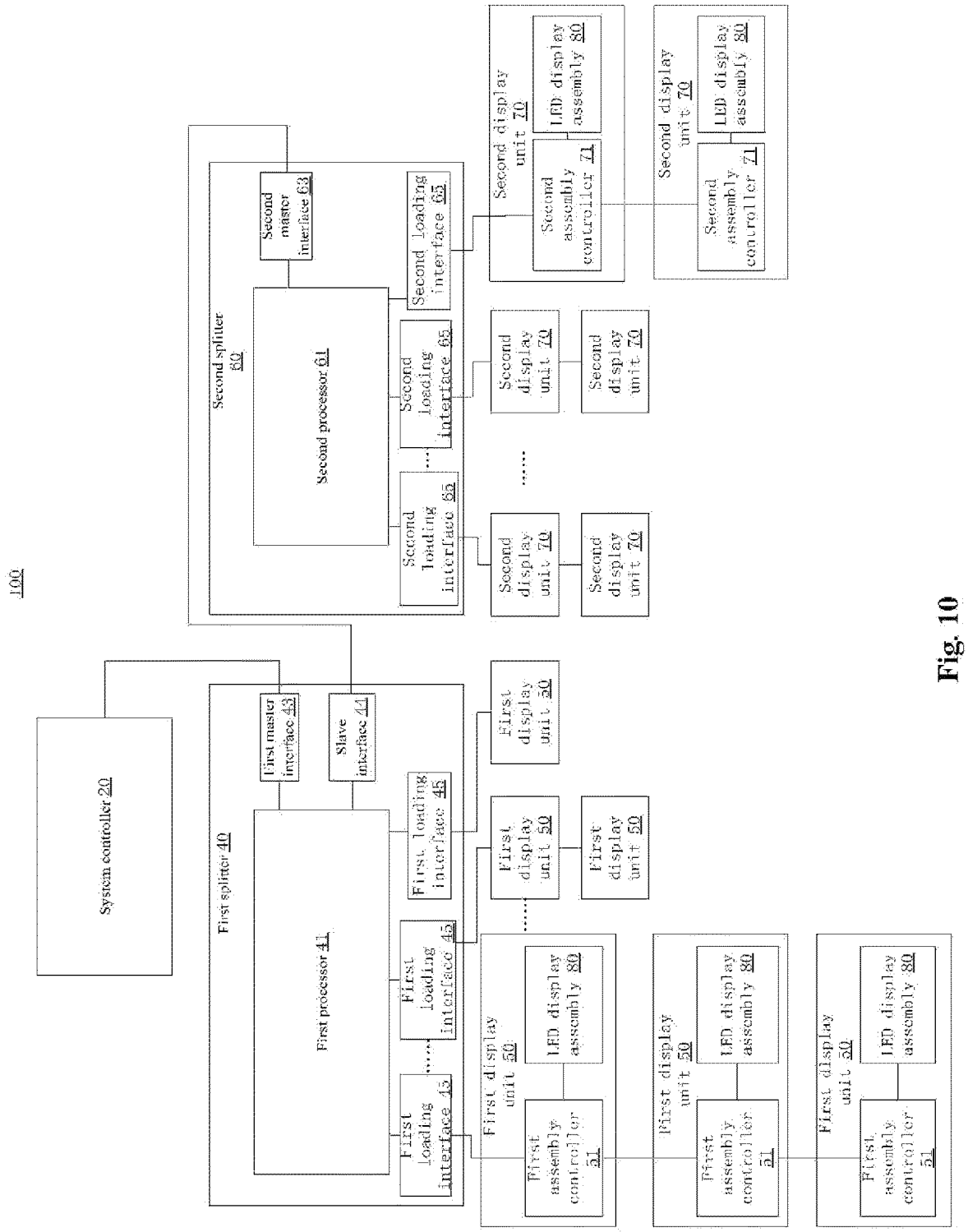
FIG. 10 is an architecture schematic diagram of an LED display system provided in the second embodiment of the disclosure.

Referring to FIG. 10, this figure is an architecture schematic diagram of an LED display system provided in a second embodiment of the disclosure. The LED display system 100 comprises, for example, a first splitter 40. The first splitter 40 comprises, for example, a first processor 41, a first master interface 43 electrically connected to the first processor 41, a slave interface 44 electrically connected to the first processor 41, and a plurality of first loading interfaces 45 electrically connected to the first processor 41 respectively. The first splitter 40 is, for example, the splitter 10 in the first embodiment, and details are not described herein again.

The LED display system 100 further comprises, for example, a plurality of first display units 50; each of the first display units 50 comprises a first assembly controller 51 and an LED display assembly 80 electrically connected to the first assembly controller 51; and the plurality of first display units 50, for example, form the LED display screen 30 as shown in FIG. 1, and details are not described herein again.

Each of the first loading interfaces 45 of the first splitter 40 is, for example, connected to one first display unit 50 or a plurality of cascaded first display units 50, respectively. The first loading interface 45 is connected to one first display unit 50 or a plurality of cascaded first display units 50, for example, by means of a network cable. For the implementation process, reference can be made to the first embodiment, and details are not described herein again.

The LED display system 100 further comprises, for example, a second splitter 60; and the second splitter 60 comprises, for example, a second processor 61, a second master interface 63 electrically connected to the second processor 61, and a plurality of second loading interfaces 65 electrically connected to the second processors 61 respectively, wherein the second master interface 63 is electrically connected to a slave interface 44, and the second master interface 63 is connected to the slave interface 44, for example, by means of a network cable. The second splitter 60 is, for example, the splitter described in the first embodiment, and details are not described herein again.

The LED display system 100 further comprises, for example, a plurality of second display units 70, and each of the second display units 70 comprises a second assembly controller 71 and an LED display assembly 80 electrically connected to the second assembly controller 71.

The plurality of second loading interfaces 65 of the second splitter 60 are respectively connected to one second display unit 70 or a plurality of cascaded second display units 70, for example, by means of a network cable. For the detailed description, reference can be made to the first embodiment, and details are not described herein again.

The plurality of first display units 50 and the plurality of second display units 70 together form the LED display screen 30 as shown in FIG. 1, and details are not described herein again.

The first processor 41 and the second processor 61 both have, for example, the device for configuring display screen described in the first embodiment so as to execute the method for configuring display screen. For a specific process, reference can be made to the detailed description of the first embodiment, and details are not described herein again.

Referring to FIG. 10 again, in one embodiment, the LED display system 100 further comprises, for example, a system controller 20. The system controller 20 is connected to the first master interface 41 of the first splitter 40, for example, by means of a cable, and the cable is, for example, a network cable.

Figure 11:
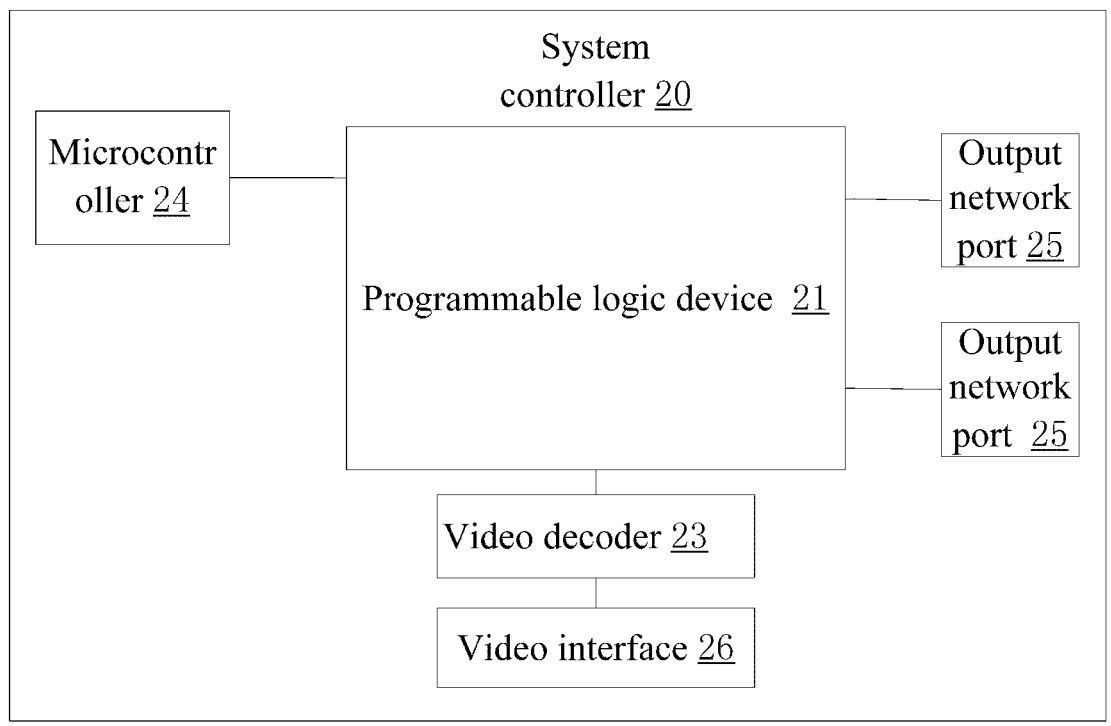
FIG. 11 is an architecture schematic diagram of the system controller in FIG. 10.

Referring to FIG. 11, in one embodiment, the system controller 20 is typically, for example, a sending card; and the system controller 20 comprises, for example, a programmable logic device 21, output network ports 25 electrically connected to the programmable logic device 21, a microcontroller 24 electrically connected to the programmable logic device 21, a video decoder 23 electrically connected to the programmable logic device 21, and a video interface 26 electrically connected to the video decoder 23, that is, the video decoder 23 is electrically connected between the video interface 25 and the programmable logic device 21. Here, the video interface 26 may be various digital video interfaces, such as an HDMI (High Definition Multimedia Interface) and a DVI, or may be various analog video interfaces, such as a VGA.

By means of the sending card, image data access to the first splitter 40 and the first splitter 60 are implemented, so that the image data are forwarded to the plurality of first loading interfaces 41 and the plurality of second loading interfaces 61 respectively, and are respectively provided to all the first display units 50 and all the second display units 70 which are respectively first loaded on the plurality of first loading interfaces 41 and the plurality of second loading interfaces 61.

Referring to FIG. 11 again, in one embodiment, the system controller 20 comprises, for example, a plurality of output network ports 25; and the system controller 25 comprises, for example, two output network ports 25.

In one embodiment, the system controller 20 in the LED display system 100 comprises, for example, a plurality of output network ports 25. For example, some or all of the plurality of output network ports 25 are respectively connected to the first master interface 43 of the first splitter 40 by means of a network cable.

In the several embodiments provided by the disclosure, it should be understood that the disclosed system, device and method may be implemented in other manners. For example, the device embodiments described above are merely illustrative. For example, the division of a unit is only a logical function division. In actual implementation, there may be another division manner, for example, multiple units or components may be combined, or may be integrated into another system, or some features may be ignored or not executed. In addition, the coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one place, or may be distributed to a plurality of network units. Some or all of the units may be selected according to actual needs to achieve the purpose of the solution of the embodiment.

In addition, the functional units in respective embodiments of the disclosure may be integrated in one processing unit, or the units may be physically and individually present, or two or more units are integrated in one unit. The integrated unit can be implemented in the form of hardware or in the form of a software plus software functional unit.

The integrated unit implemented in the form of a software functional unit may be stored in a computer-readable storage medium. The software functional unit is stored in a storage medium, comprising several instructions for enabling a computer device (which may be a personal computer, a server, a network device, etc.) to execute some of the steps of the method in respective embodiments of the disclosure. The foregoing storage medium includes: media such as a USB flash disk, a mobile hard disk, a Read-Only Memory (ROM), a Random Access Memory (RAM), a magnetic disk or an optical disk that can store program codes.

Finally, it should be explained that, the above embodiments are only used to explain the technical solutions of the present invention, and not for limitation thereto. Although the present invention has been explained in details with reference to the above embodiments, it should be understood by those skilled in the art that they can still modify the technical solutions disclosed in the above respective embodiments or make equivalent replacements of some of the technical features. These modifications or replacements shall not render the substance of the corresponding technical solutions to depart from the spirit and scope of the technical solutions in the respective embodiments of the disclosure.

What is claimed is:

1. A splitter, wherein the splitter is applicable to an LED display screen, wherein the LED display screen comprises a plurality of display units, each of the display units comprises an assembly controller and an LED display assembly electrically connected to the assembly controller, and the LED display assembly comprises a plurality of LED display pixels; and the splitter comprises:
a processor;
a master interface electrically connected to the processor; and
a plurality of loading interfaces, electrically connected to the processor respectively, wherein each of the loading interfaces is configured to load one of the display units or a plurality of cascaded display units,
wherein, the processor is configured to forward image data input from the master interface to the plurality of loading interfaces, so that the assembly controller of each of the display units loaded on the plurality of loading interfaces performs, according to a sequence number of the assembly controller, a capture operation on image data output by the corresponding loading interfaces to acquire image data of the assembly controller so as to drive and control the LED display assembly of the display unit to display; and the sequence numbers of the assembly controllers of display units respectively first loaded on the plurality of loading interfaces are different from each other.

2. The splitter as claimed in claim 1, wherein the processor comprises a programmable logic device and a microcontroller electrically connected to the programmable logic device, and the master interface and the plurality of loading interfaces are network ports electrically connected to the programmable logic device, respectively.

3. The splitter as claimed in claim 1, wherein the splitter further comprises a slave interface electrically connected to the processor, and the processor is further configured to forward image data input from the master interface to the slave interface for transmission to a next-level splitter.

4. The splitter as claimed in claim 1, wherein the processor is further configured to generate a sequence packet of each of the loading interfaces according to configuration parameters input from the master interface, and enable the sequence packet to be output through the loading interface, so that assembly controllers of all display units loaded on the loading interfaces determine sequence numbers of the assembly controllers on the basis of the sequence packet, wherein the configuration parameters include a serial number of each of the loading interfaces and the sequence number of the assembly controller of the first display unit loaded on the loading interface, and the sequence numbers of the assembly controllers of the first display units included in the sequence packets respectively corresponding to the plurality of loading interfaces are different from each other.

5. An LED display system, comprising:
a plurality of first display units, wherein each of the first display units comprises a first assembly controller and an LED display assembly electrically connected to the first assembly controller;
a first splitter, provided with a first processor and a first master interface, a slave interface and a plurality of first loading interfaces electrically connected to the first processor, wherein each of the first loading interfaces is configured to load one of the first display units or a plurality of cascaded first display units, and the first processor is configured to forward image data input from the first master interface to the plurality of first loading interfaces and the slave interface, so that the first assembly controller of each of the first display units performs, according to a sequence number of the assembly controller, a capture operation on image data output by the corresponding first loading interface to acquire image data of the assembly controller so as to drive and control the LED display assembly of the first display unit to display;
a plurality of second display units, wherein each of the second display units comprises a second assembly controller and an LED display assembly electrically connected to the second assembly controller; and
a second splitter, provided with a second processor and a second master interface and a plurality of second loading interfaces electrically connected to the second processor, wherein the second master interface is electrically connected to the slave interface of the first splitter, each of the second loading interfaces is configured to load one of the second display units or a plurality of cascaded second display units, and the second processor is configured to forward image data input from the second master interface to the plurality of second loading interfaces, so that the second assembly controller of each of the second display units performs, according to a sequence number of the assembly controller, a capture operation on image data output by the corresponding second loading interface to acquire its own image data so as to drive and control the LED display assembly of the second display unit to display,
wherein, the sequence numbers of the first assembly controllers of the first display units respectively first loaded by the plurality of first loading interfaces are different from each other, the sequence numbers of the second assembly controllers of the second display units respectively first loaded by the plurality of second loading interfaces are different from each other, and the sequence number of the first assembly controllers of the first display units respectively first loaded on the plurality of first loading interfaces are different from the sequence numbers of the second assembly controllers of the second display units respectively first loaded on the plurality of second loading interfaces.

6. The LED display system as claimed in claim 5, wherein the first processor comprises a programmable logic device and a microcontroller electrically connected to the programmable logic device, and the first master interface, the slave interface and the plurality of first loading interfaces are network ports electrically connected to the programmable logic device, respectively.

7. The LED display system as claimed in claim 5, wherein the LED display system further comprises a system controller, and the system controller is connected to the first master interface of the first splitter by means of a cable.

8. The LED display system as claimed in claim 7, wherein the system controller comprises a video interface, a video decoder, a programmable logic device, a microcontroller and output network ports, the video decoder is electrically connected between the video interface and the programmable logic device, and the microcontroller and the output network ports are electrically connected to the programmable logic device, respectively; and the output network ports are connected to the first master interface of the first splitter by means of the cable.

9. The LED display system as claimed in claim 5, wherein the first processor is further configured to generate a sequence packet of each of the first loading interfaces according to configuration parameters input from the first master interface, and enable the sequence packet to be output through the first loading interface, so that first assembly controllers of all first display units loaded on the first loading interface determine their own sequence numbers on the basis of the sequence packet, wherein the configuration parameters include a serial number of each of the first loading interfaces and the sequence number of the first assembly controller of the first display unit loaded on the first loading interface, and the sequence numbers of the first assembly controllers of the first display units included in the sequence packets respectively corresponding to the plurality of first loading interfaces are different from each other.

10. A method for configuring display screen, wherein the method is applicable to a splitter electrically connected to an LED display screen; and comprises:
acquiring an initial sequence packet, wherein the initial sequence packet comprises a splitter serial number data segment and a first assembly controller serial number data segment;
acquiring configuration parameters, wherein the configuration parameters include a serial number of the splitter, serial numbers of a plurality of loading interfaces of the splitter and a serial number of an assembly controller in the first display unit loaded on each of the loading interfaces; and
updating the content of the first assembly controller serial number data segment in the initial sequence packet according to the serial number of the assembly controller in the first display unit loaded on each of the loading interfaces, so as to obtain a plurality of target sequence packets respectively corresponding to the plurality of loading interfaces and output respective target sequence packets through each of the loading interfaces, so that assembly controllers in all display units loaded on the loading interfaces determine their own sequence numbers in sequence, the plurality of target sequence packets being different from each other.

11. The method for configuring display screen as claimed in claim 10, further comprising:

updating the content of the splitter serial number data segment in the initial sequence packet, and keeping the content of the first assembly controller serial number data segment unchanged, so as to obtain a new initial sequence packet and deliver, through a slave interface of the splitter, same to a next-level splitter electrically connected to the slave interface.

12. The method for configuring display screen as claimed in claim 11, wherein each of the loading interfaces and the slave interface are network ports, respectively.

13. A device for configuring display screen, wherein the device for configuring display screen is applicable to a splitter electrically connected to an LED display screen; and comprises:

a first acquisition module, configured to acquire an initial sequence packet, wherein the initial sequence packet comprises a splitter serial number data segment and a first module controller serial number data segment;

a second acquisition module, configured to acquire configuration parameters, wherein the configuration parameters include a serial number of the splitter, serial numbers of a plurality of loading interfaces of the splitter and a serial number of a module controller in the first display unit loaded on each of the loading interfaces; and a sequence module, configured to update the content of the first module controller serial number data segment in the initial sequence packet according to the serial number of the module controller in the first display unit loaded on each of the loading interfaces, so as to obtain a plurality of target sequence packets respectively corresponding to the plurality of loading interfaces and output respective target sequence packets through each of the loading interfaces, so that module controllers in all display units loaded on the loading interfaces determine their own sequence numbers in sequence, the plurality of target sequence packets being different from each other.

14. The device for configuring display screen as claimed in claim 13, characterized by further comprising:

an update module, configured to update the content of the splitter serial number data segment in the initial sequence packet and keep the content of the first module controller serial number data segment unchanged, so as to obtain a new initial sequence packet and deliver, through a slave interface of the splitter, same to a next-level splitter electrically connected to the slave interface.

15. The device for configuring display screen as claimed in claim 14, wherein each of the loading interfaces and the slave interface are network ports, respectively.

* * * * *